United States Patent [19]

Yamamori et al.

[11] 4,410,603

[45] Oct. 18, 1983

[54] MAGNETIC RECORDING MEDIUM

[75] Inventors: Kazuyoshi Yamamori, Kawasaki; Reiji Nishikawa, Tokyo; Tatsuo Fujiwara; Toshimitsu Asano, both of Yokohama, all of Japan

[73] Assignee: Tokyo Shibaura Denki Kabushiki Kaisha, Kawasaki, Japan

[21] Appl. No.: 304,676

[22] Filed: Sep. 22, 1981

[30] Foreign Application Priority Data

Sep. 22, 1980 [JP] Japan .................. 55-132144

[51] Int. Cl.³ ............................. H01F 1/00
[52] U.S. Cl. .................... 428/611; 428/626; 428/667; 428/678; 428/928
[58] Field of Search ............ 427/132, 128, 48; 428/900, 611, 694, 626, 928, 678, 667

[56] References Cited

U.S. PATENT DOCUMENTS

| | | | |
|---|---|---|---|
| 4,144,585 | 3/1979 | Hibner | 428/900 |
| 4,210,946 | 7/1980 | Iwasaki et al. | 360/131 |
| 4,277,809 | 7/1981 | Fisher et al. | 428/900 |

OTHER PUBLICATIONS

IEEE Trans. on Magn. vol. MAG-15, No. 6, pp. 1456–1458; Iwasaki et al., Nov. 1979.

Primary Examiner—Bernard D. Pianalto
Attorney, Agent, or Firm—Oblon, Fisher, Spivak, McClelland & Maier

[57] ABSTRACT

A magnetic recording medium for perpendicular magnetic recording comprises a low coercive force material, and a magnetic recording layer which is formed on the low coercive force layer and has magnetic anisotropy perpendicular to the surface of said low coercive force layer. The magnetic recording layer is of 0.3 μm or less in thickness.

7 Claims, 8 Drawing Figures

MAGNETIC RECORDING MEDIUM

BACKGROUND OF THE INVENTION

This invention relates to a magnetic recording medium used in perpendicular magnetic recording.

Recently, general attention is attracted to perpendicular magnetic recording intended to assure high density recording. This perpendicular magnetic recording has been proposed in substitution for the conventional longitudinal magnetic recording in which magnetization aligns along the longitudinal direction of a magnetic tape. Said perpendicular magnetic recording is affected by forming a magnetic field acting perpendicularly to the recording medium, for example, a tape, that is, in the direction of the thickness of the tape. The known magnetic recording medium used for the abovementioned perpendicular magnetic recording includes a double layer type (FIG. 1(a)) which is constructed by forming a low coercive force layer 2 on a nonmagnetic base 1, and placing on said low coercive force layer 2 a magnetic recording layer 3 indicating anisotropy perpendicularly to said low coercive force layer 2; and a single layer type (FIG. 1(b)) which is constructed by forming a magnetic recording layer 3 directly on a nonmagnetic base 1.

The following literature reports that the former double layer type (FIG. 1(a)) is far more advantageous than the latter single layer type (FIG. 1(b)) in respect of, for example, the recording and reproduction efficiency.

(i) Shinichi IWASAKI: IEEE Trans. on Magn., Vol. Mag-16 No. 1, 1980, PP 71–76

(ii) Patent Disclosure Sho54 (1979)-51804

The above-mentioned literature discloses that a Co-Cr alloy layer indicates good properties as the recording layer 3.

Further, a summary 22aA-9 of scientific lectures given in the second session of Magnetics Society of Japan reports that if formed with a smaller thickness than 0.3 μm, said single Co-Cr layer does not indicate a sufficient perpendicular orientation as viewed from, for example, the process of crystalline growth. The Co-Cr recording layer formed with a small thickness has hitherto been considered to decrease in reproduced output. Therefore, the above-listed literature (ii) states that the Co-Cr recording layer should preferably have a thickness ranging between over 0.5 μm and less than 3.0 μm. However, a perpendicular magnetic recording medium provided with a low coercive force layer and such specified magnetic recording layer still has the drawback that said recording medium is not fully satisfactory in respect of freedom from the so-called tape noise, or the signal to noise (S/N) ratio. Therefore, demand has been made for the improvement of said conventional recording medium.

SUMMARY OF THE INVENTION

This invention has been accomplished in view of the above-mentioned circumstances and is intended to provide a magnetic recording medium which is improved in the recording-reproducing efficiency.

To attain the above-mentioned object, this invention provides a magnetic recording medium which comprises:

a low coercive force material; and a magnetic recording layer which is formed on the low coercive force layer and has magnetic anisotropy perpendicular to the surface of said low coercive force layer, and wherein the magnetic recording layer is of a smaller thickness than 0.3 μm.

The present invention have conducted studies on relationships between the thickness of a magnetic recording layer included in a magnetic recording medium constructed as illustrated in FIG. 1(a) and the recording-reproducing efficiency. As a result, it has been discovered that where, contrary to one aforementioned conventional concept, a magnetic layer prepared from, for example, a Co-Cr alloy, has its thickness extremely reduced to less than 0.3 μm, preferably to a range from 200 Å to 0.3 μm, or more preferably from 0.05 to 0.1 μm, then it is possible, for example, to decrease tape noises, resulting in larger S/N ratio, and improve the flexibility of the resultant recording medium.

DETAILED DESCRIPTION OF THE PREFERRED EMBODIMENT

Description is now given with reference to the accompanying drawings of a magnetic recording medium embodying this invention.

FIGS. 2 to 5 show the results of experimentally determining the relationships between the various thicknesses δA of the magnetic recording layer, and the recording-reproducing efficiency of a magnetic recording medium containing said magnetic recording layer. The experiments were made with a magnetic recording medium which comprised a Co-Cr magnetic recording layer and a low coercive force layer whose thickness was chosen to be 1 μm.

Figure 1A:
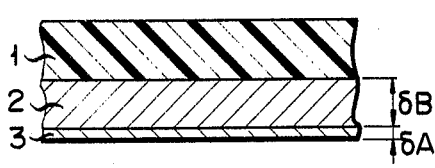
FIGS. 1(a) and 1(b) are sectional views of the fundamental constructions of magnetic recording media.
Figure 1B:
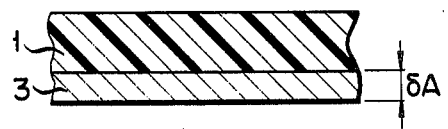
Figure 2:
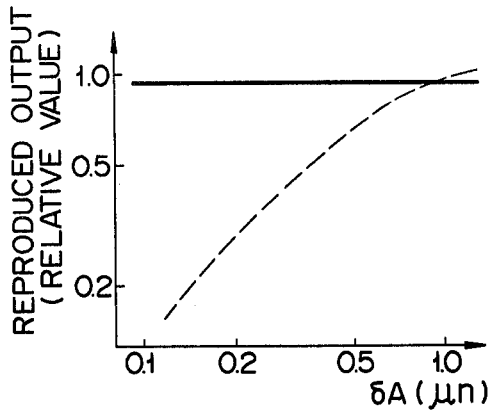
FIGS. 2 to 5 are curve diagrams showing relationships between the thickness δA of a magnetic recording layer and the properties of a magnetic recording medium containing said magnetic recording layer.

FIG. 2 shows changes in the output of a magnetic recording medium whose Co-Cr layer was chosen to have a thickness δA and whose recorded signals had a wavelength of 2 μm. Throughout FIGS. 2 to 5, a solid line indicates the properties of a double layer tape magnetic recording medium of FIG. 1(a). A broken line shows the properties of a single layer type magnetic recording medium of FIG. 1(b). The results of experiments given in FIGS. 2 to 5 show that the double layer type magnetic recording medium indicated a substantially uniform reproduced output regardless of the thickness δA of the magnetic recording layer, whereas the single layer type magnetic recording medium more noticeably decreased in the reproduced output, as the thickness δA of the magnetic recording layer was reduced. As viewed from the reproduction output of the single layer type magnetic recording medium, it is inferred that the practically applicable thickness δA of a magnetic recording layer should be greater than at least 0.3 μm or preferably 0.5 μm. It is supposed that the thickness of a magnetic recording layer has hitherto been defined from the above-mentioned point of view.

Figure 3:
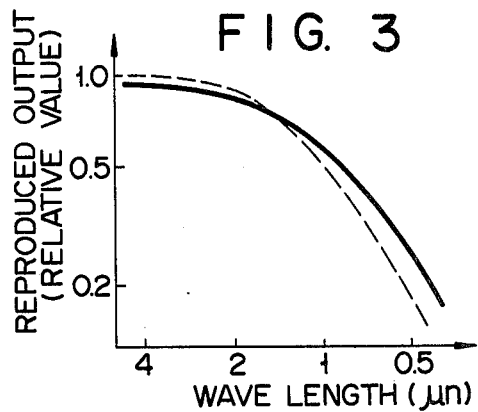

FIG. 3 indicates the wavelength characteristic of a double layer type magnetic recording medium whose low coercive force layer was chosen to have a thickness δB of 1.0 μm and whose magnetic recording layer was chosen to have a thickness δA of 0.1 μm, and the wavelength characteristic of a single layer type magnetic recording medium whose magnetic recording layer was chosen to have a thickness δA of 1.0 μm. A solid line given in FIG. 3 represents a double layer type magnetic recording medium whose magnetic recording layer was chosen to have a thickness δA of 0.1 μm. A broken line given in FIG. 3 denotes a double layer type magnetic recording medium above magnetic recording layer was chosen to have a thickness δA of 1.0 μm. It is seen from FIG. 3 that a double layer type magnetic recording medium, in which the low coercive force layer had a certain magnitude of thickness δB, possessed wavelength characteristics the same as or better than those of a single layer type magnetic recording medium whose magnetic recording layer was chosen to have a thickness δA of 1.0 μm even when the thickness δA of the magnetic recording layer of the former double layer type magnetic recording medium was reduced to 0.1 μm.

Figure 4:
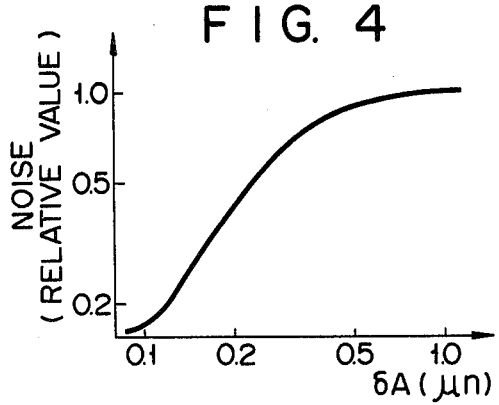
Figure 5:
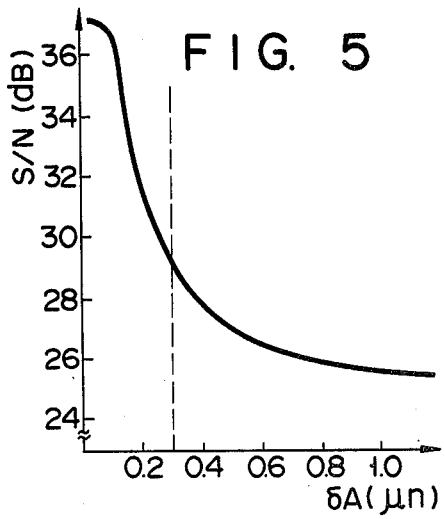

FIG. 4 shows changes in an amount of noises when the thickness δA of the magnetic recording layer of the double layer type magnetic recording medium was varied. FIG. 5 indicates changes in the S/N ratio for the case of FIG. 4. Referring to FIGS. 4 and 5, noises were determined by measuring the modulation noises of 4 MHz carrier signals with a tape speed set at 2 m/sec and a frequency band defined within the range of 0 to 6 MHz. Data given in FIG. 5 prove that the smaller the thickness δA of the magnetic recording layer, the more noticeable the reduction of noises and consequently the more improved the S/N ratio. Namely, it is seen from FIG. 5 that particularly when the thickness δA of the magnetic recording layer was reduced to less than 0.3 μm, then the S/N ratio greatly increased. This increase can also be inferred from the reproduced output characteristic of FIG. 2 and the noise characteristic of FIG. 4.

Figure 6A:
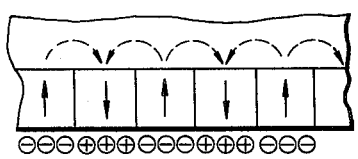
FIGS. 6(a) and 6(b) illustrate the effect of a magnetic recording medium embodying this invention.
Figure 6B:
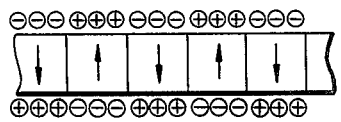

At the present time, the general properties of the above-mentioned double layer type magnetic recording medium still has much room for further clarification. However, the following assumption can be advanced with reference to FIGS. 6(a) and 6(b) showing the manner in which data is recorded on the magnetic recording layer of said double layer type magnetic recording medium. When perpendicular magnetic recording is made on the single layer type magnetic recording medium, surface charges (FIG. 6(b)) are generated on both top and bottom sides of the magnetic recording layer. If, in this case, the magnetic recording layer thickness δA is reduced, surface charges on both sides of the magnetic recording layer counterbalance each other, resulting in a decrease in the reproduced output of said single layer type magnetic recording medium.

In contrast, with a double layer type magnetic recording medium whose low cocercive force layer has a sufficiently large thickness as shown in FIG. 1(a), a magnetic flux is enclosed in the low coercive force layer, preventing surface charges from being generated on the backside of the magnetic recording layer. Even if, therefore, the magnetic recording layer has a small thickness δA, it is assumed that the same action will occur as that which is carried out by a single layer type magnetic medium in which the thickness of the magnetic recording layer is substantially taken to be δA=∞.

On the other hand, the following condition $$K_u = K_\perp - E_s > 0$$

should be satisfied in order to let the magnetic recording layer indicate the perpendicular anisotropy. In the above equation, $K_\perp$ denotes the perpendicular anisotropic energy specific of the magnetic recording layer and $E_s$ represents static magnetic energy. With the single layer type magnetic recording medium, $E_s$ may be expressed as $$E_s(S) = \tfrac{1}{2} M \cdot H = \tfrac{1}{2} M_s (4\pi M_s) = 2\pi M_s^2$$

With the double layer type magnetic recording medium, in which the backside surface charges of the magnetic recording layer are reduced due to the magnetic flux closure by the soft magnetic layer, $E_x$ is assumed to have a value expressed as $$E_s(D) = \tfrac{1}{2} M \cdot H < 2\pi M_s^2$$

Supposing that the soft magnetic layer idealistically closes all magnetic flux generated from backside surface charges then demagnetizing field prevailing in the recording medium has a value of $2\pi M_s$. Therefore, the static magnetic energy $E_s(D)$ is expressed as $$E_s(D)^* = \pi M_s^2$$

With the double layer type magnetic recording medium, therefore, the condition $K_u > 0$ is fully satisfied, even where the magnetic recording layer has a smaller thickness δA than that of the single layer type magnetic recording medium, and the perpendicular anisotropic energy $K_\perp$ becomes smaller. Consequently, the double layer type magnetic recording medium is considered to exhibit a fully satisfactory recording-reproducing property, even when the thickness δA of the magnetic recording layer is reduced to less than 0.3 μm. This is rather surprising in view of the general belief that if the Co-Cr recording layer is formed relatively thinly, the inherent anisotropic property of the Co-Cr layer, i.e. $K_\perp$ will not be sufficiently obtained in view of the crystal growth thereof.

Various materials may be cited for use as the soft magnetic layer of the double layer type magnetic recording medium. Generally, an Fe-Ni alloy is preferred for the reason based on, for example, the property and ease of manufacture. With a low coercive force layer prepared from the Fe-Ni alloy, it is easy to grow an axis <1.1.1> perpendicularly of said layer. This axis <1.1.1> is ready to be grown to the axis <0.0.2> of a Co-Cr layer. This crystal growth is considered to be the factor which assures a good recording-reproducing property for the double layer type magnetic recording medium, even if the magnetic recording layer has the above-mentioned small thickness δA.

From another point of view, where the magnetic recording layer is reduced in thickness δA, the low coercive force layer can be drawn nearer to the recording head. Therefore, as disclosed in a summary 22aA-5 of scientific lectures given in the second session of Magnetics Society of Japan, the so-called magnetic interaction between the head and the medium forcefully works, improving the magnetic field distribution and magnetic intensity of a magnetic recording head.

Further when extremely reduced in the thickness δA, the magnetic recording layer is ready to receive only the most idealistic recording magnetic field prevailing at the tip of the magnetic pole of the magnetic head. The idealistic magnetization of the Co-Cr magnetic recording layer made by said magnetic field controls the magnetization of the whole of the double layer type magnetic recording medium, enabling this recording medium to indicate good recording-reproducing property.

As described above, a magnetic recording medium embodying this invention has been accomplished from the discovery that it is proper to reduce the hitherto adopted thickness δA of a magnetic recording layer to less than 0.3 μm. Said thickness δA is actually preferred to range between over 200 Å and less than 0.3 μm. The reason is that if the thickness δA decreases from 200 Å, then defects appear in a magnetic recording layer produced, causing recorded data to drop out.

The above-mentioned noticeable reduction of the thickness of a magnetic recording layer against the hitherto prevailing concept offers the advantages that noises are decreased, assuring the noticeable increase of the S/N ratio; the reduced thickness of the magnetic recording layer enables the inexpensive manufacture of a magnetic recording medium; and the flexibility of the magnetic recording medium is increased, thereby reducing the spacing between the recording layer and the magnetic head, so that the reproduced output of the magnetic recording medium is increased.

It will be noted that this invention is not limited to the foregoing embodiment. For instance, a nonmagnetic base may be prepared from any of the known materials such as synthetic resins, for example, polyimide, polycarbonate, etc., or hard materials such as glass and aluminium. Further, if a soft magnetic layer having a sufficiently great mechanical strength is applied, then it will be possible to omit said nonmagnetic base.

The low coercive force material may be formed of not only a N-Fe alloy but also any other known material such as a Ni-Fe-Mo alloy or Ni-P alloy. The magnetic recording layer may be formed of not only a Co-Cr alloy, but also a Ba-ferrite series oxides or Mn-Bi intermetallic compound.

The thickness δB of the low coercive force material used in this invention need not be limited to 1 μm. This thickness δB should be defined by the wavelength of a recorded signal. If the recorded signal has a long wavelength, then the thickness δB should be enlarged. If the recorded signal has a short wavelength, then the thickness δB may be reduced. Insofar as the magnetic recording medium of this invention is applied, the thickness δB of the low coercive force material is chosen to range between 0.5 and 2.0 μm.

What we claim is:

1. A magnetic recording medium which comprises:
   a low coercive force material; and
   a magnetic recording layer which is formed on the low coercive force layer and whose magnetic anisotropy is perpendicular to the surface of said recording layer,
   and wherein the magnetic recording layer is of a smaller thickness than 0.3 μm.

2. The magnetic recording medium according to claim 1, wherein the magnetic recording layer is formed of a Co-Cr alloy.

3. The magnetic recording medium according to claim 1 or 2, wherein the magnetic recording layer is of a thickness ranging between 200 Å and 0.3 μm.

4. The magnetic recording medium according to claim 1 or 2, wherein the low coercive force layer is of a thickness ranging between 0.5 and 2.0 μm.

5. The magnetic recording medium according to claim 1 or 2, wherein the low coercive force layer is formed of Fe-Ni alloy.

6. The magnetic recording medium according to claim 1 or 2, wherein the low coercive force layer is previously formed on a nonmagnetic base.

7. The magnetic recording medium according to claim 6, wherein the nonmagnetic base is formed of a synthetic resin.

* * * * *